United States Patent [19]

Bailey

[11] 4,333,244
[45] Jun. 8, 1982

[54] LEVELING STAND

[76] Inventor: Ivan Bailey, 3205 Pamala Park Estates, Maple Ave., Conneaut, Ohio 44030

[21] Appl. No.: 101,871

[22] Filed: Dec. 10, 1979

[51] Int. Cl.³ .............................................. G01C 5/00
[52] U.S. Cl. ......................................... 33/290; 33/299
[58] Field of Search ................. 33/290, 291, 292, 374, 33/375, 376, 299

[56] References Cited

U.S. PATENT DOCUMENTS

| 212,405 | 2/1879 | Saegmuller | 33/299 |
| 527,815 | 10/1894 | Schnell | 33/375 |
| 761,219 | 5/1904 | Goodwin | 33/290 |
| 861,011 | 7/1907 | Ahlerg | 33/290 |
| 928,600 | 7/1909 | Greene | 33/290 |
| 1,270,074 | 6/1918 | Veenstra | 33/290 |
| 1,274,696 | 8/1918 | DeFay | 33/375 |
| 2,407,960 | 9/1946 | Mariotti | 33/290 |

FOREIGN PATENT DOCUMENTS 5945 of 1909 United Kingdom ................. 33/290

Primary Examiner—Steven L. Stephan
Attorney, Agent, or Firm—Charles L. Lovercheck

[57] ABSTRACT

A level and support made up of two spaced tripods each having a bracket supporting one end of the level. Each bracket has a rifle sight on it which can be aligned with the other end on a distant object to establish the level thereof. In a separate embodiment a single level has a double bracket arrangement on it with two clamps each having a rifle sight which can be sighted onto distant objects.

1 Claim, 6 Drawing Figures

LEVELING STAND

GENERAL DESCRIPTION OF THE INVENTION

Plumbers, carpenters, stone masons, brick layers and other craftsmen have a need for a convenient economical way of establishing the level of various planes. Applicant has provided an arrangement for levels which is simple, economical and efficient, and utilizes a level of the type already owned by most such craftsmen.

REFERENCE TO PRIOR ART

The following patents show various types of leveling devices, but none of them show the level device having the features of that disclosed herein.

U.S. Pat. No. 1,709,310 shows a mason's level with gun sites on it with supports for supporting it above the ground for leveling purposes.

U.S. Pat. No. 3,475,821 shows a gun siting device.

U.S. Pat No. 861,011 shows a level on a tripod with sites.

OBJECTS OF THE INVENTION

It is an object of the invention to provide an improved leveling device.

Another object of the invention is to provide a level and support for leveling distant objects that utilizes an ordinary carpenter's level supported on a tripod.

Another object of the invention is to provide a level that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
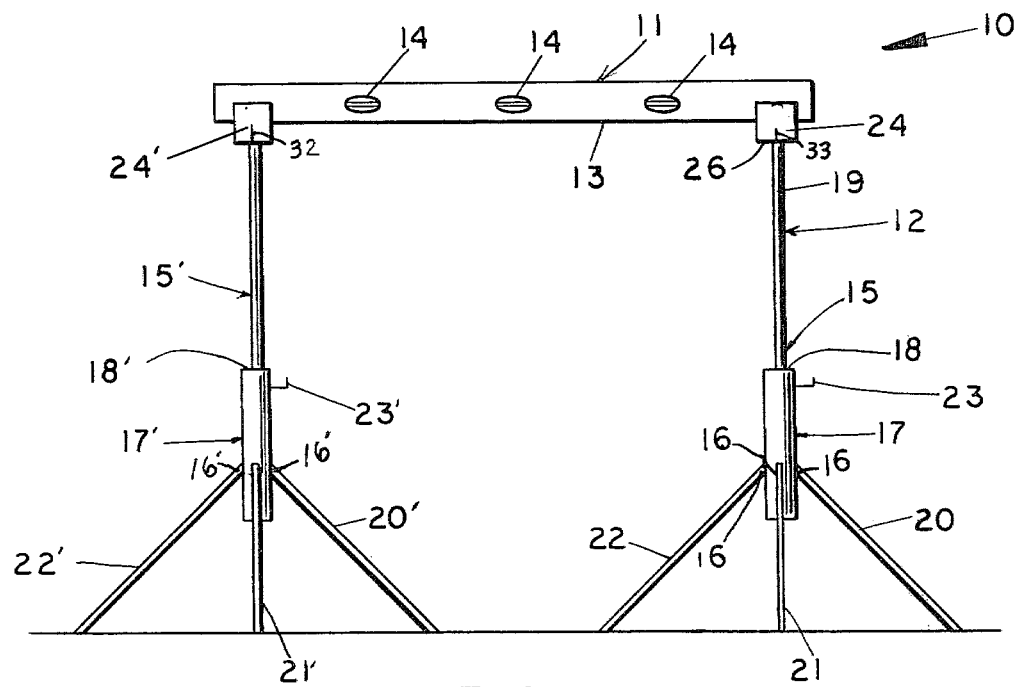
FIG. 1 is a view of the level and support according to the invention set up on tripods.
Figure 2:
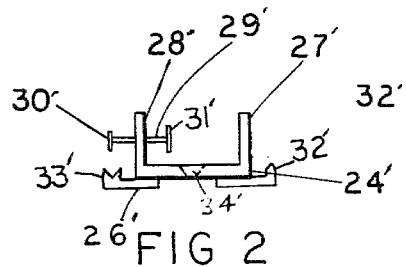
FIG. 2 is an enlarged view of one of the clamps in FIG. 1.
Figure 3:
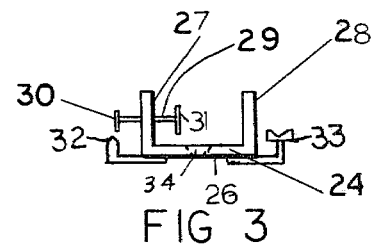
FIG. 3 is a view of the other clamp shown in FIG. 1.
Figure 4:
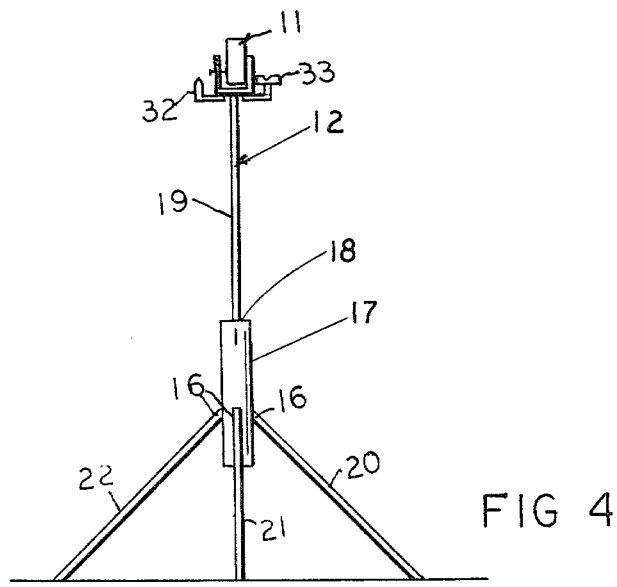
FIG. 4 is a view taken at a right angle to the view of the level shown in FIG. 1.

Now, with more particular reference to the drawings, the combination of level and tripods is indicated generally at 10 in FIG. 1, which has a plumb-level tool 11 of the type familiar to those skilled in the art, and of the type which most carpenters, masons, brick layers and plumbers have in their tool kits. The support 12 for the level is tripods 15 and 15'. The level 11 has an elongated body 13 with spirit levels, vials 14 supported in spaced openings as indicated in a manner familiar to those skilled in the art. The support means 12 for the level includes the tripods 15 and 15'. The tripods 15 and 15' each have a base body 17 and 17' having vertically extending bores 18 and 18'. Bore 18 receives the rod 19 which is telescopically slidable therein and may be locked in place by the thumb screws 23. Bore 18' receives the rod 19'. The base has legs 20, 21 and 22 swingably attached thereto and pivoted on hinges 16 so that they may be folded into generally parallel relation to the body 17.

Brackets 24 and 24' are fixed to the upper end of the rods 19 and 19'. The brackets 24 and 24' have a horizontal web member 26 fixed to it. Web member 26 has the upwardly extending spaced first jaw 27 and 27' and second jaw 28 and 28' fixed to each end of it and jaws 28 and 28' have internally threaded holes which receives the screws 29 and 29'. The screws 29 and 29' have handles 30 and 30' on their outer end and an upper body engaging member 31 and 31' on its inner end. A male gun sight 32 is fixed to jaw 27 and a female sight 33 is fixed to jaw 28. A male sight 32' is fixed to jaw 27' and a female sight 33' is fixed to jaw 28'. Thus, the sights can be used to level in either direction. The tripod is adapted to be vertically adjusted for moving said level body to said level position. Brackets 24 and 24' are held to rods 19 and 19' by screws 34 and 34' to rotate thereon. The male and female sight members 32 and 33 are adapted to be aligned with the top of said slot in said female sight member 33 when said body is level, whereby an operator can sight one of the male sight members on the female sight member to determine the level thereof. The tripod 15 has similar parts corresponding to the parts 12-34 on the tripod 15' in FIGS. 1–4. The parts corresponding to the parts 12-24 are numbered with the same numbers that are used on the corresponding member of the other tripod with the prime number added to distinguish them.

Figure 5:
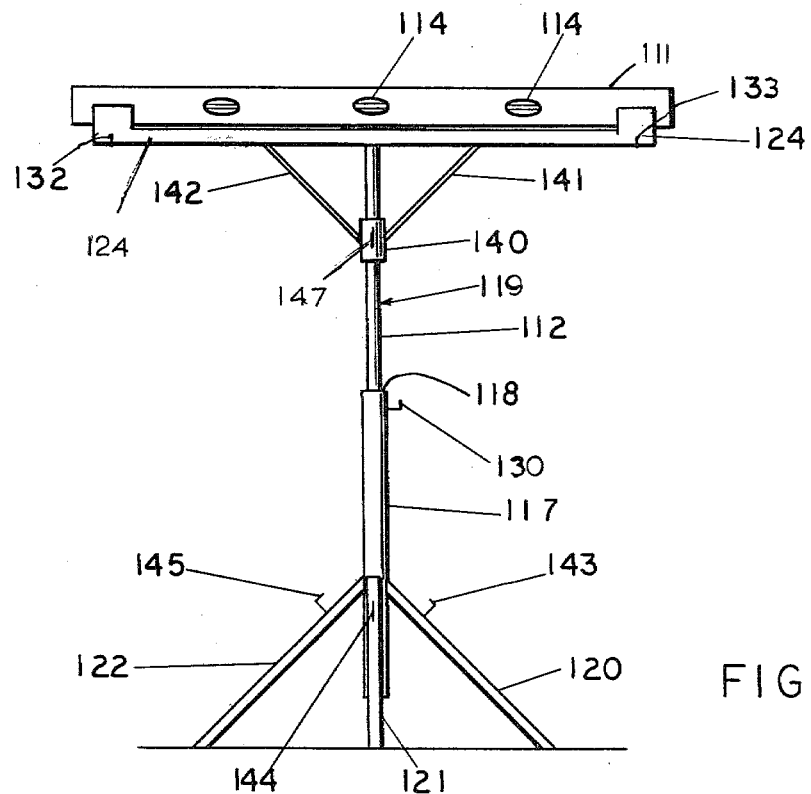
FIG. 5 is a side view of another embodiment of the invention.
Figure 6:
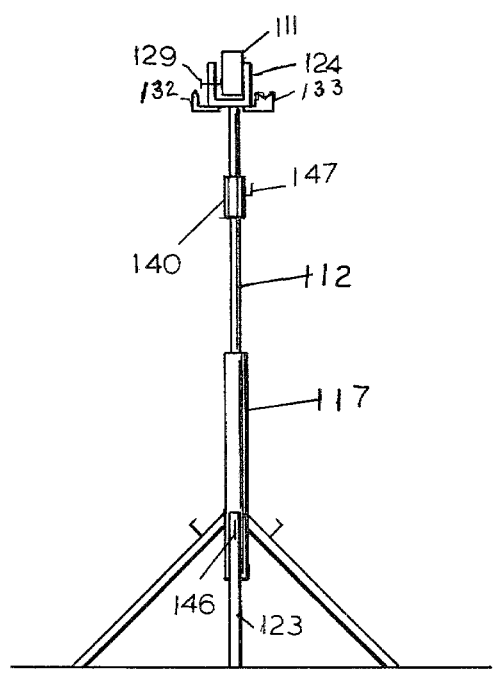
FIG. 6 is an end view of the embodiment shown in FIG. 5.

In the embodiment of the invention shown in FIGS. 5 and 6, I show an embodiment wherein a single stand 112 supports a plumb-level 111. The stand 112 has a body 117 and a rod 119 slidably received therein and vertically adjusted by thumb screw 130. The legs 120, 121, 122 and 123 are telescopic and have thumb screws 143, 144, 145 and 146 to lock the lugs in adjusted position to adjust the vertical position of the rod 119. The level 111 is supported in the brackets 124 which are held in position therein by thumb screws 129. The sights 132 and 133 are used for aligning the level with a distant object.

The level 111 is supported on stand 112 which is pivoted on rod 119 by sleeve 140. Sleeve 140 is rotatably received on rod 119 and braces 141 and 142. These braces 141 and 142 hold the support member 124 in perpendicular relation to rod 119. Thus, the operator can level the stand by adjusting legs in position and he can then proceed to swing level 111 to the desired position and sight on distant objects by means of sights 122 and 123, lacking if desired with thumb screw 147.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination,
   a level,
   said level having an elongated level body 11, a stand 12 having a base 17,
said base 17 comprising a base body 16 having a vertically extending bore 18 therein,
a rod 19 telescopically and rotably received in said bore 16,
support means 24 supported onto said rod,
said base body 16 having at least three legs, swingably attached thereto to swing from a folded position to an erect position and to rest on the ground,
said legs being telescopic whereby the length thereof can be adjusted for adjusting the level of said rod and said level body,
spaced brackets fixed to said support means,
said brackets each comprising a horizontal web member fixed to said support means,
a first jaw member and second jaw member,
said jaw members extending upwardly, fixed to said web and defining a space there-between, and threaded clamp means on said jaw members, adapted to clamp said level body between said jaws,
and two spaced rifle sights fixed to said brackets for establishing the level of distant objects,
said support means comprising a turntable level holder pivotably supported on said telescoping rod,
a sleeve rotatably supported on said rod below said level holder and base rod attached to said sleeve and to said level holder whereby said level can be swung around said body.

* * * * *